Figure 1:
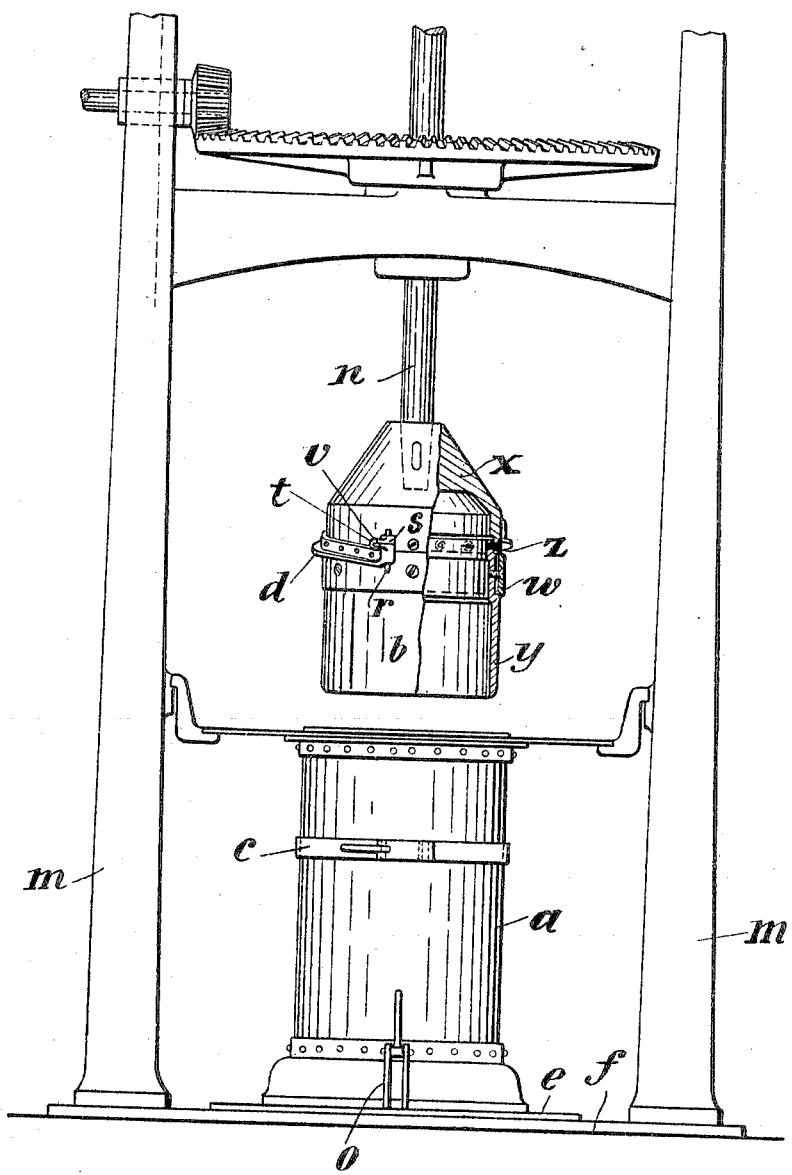

No. 811,297. PATENTED JAN. 30, 1906.
C. J. KIELBERG.
MOLDING APPARATUS.
APPLICATION FILED JUNE 21, 1905.

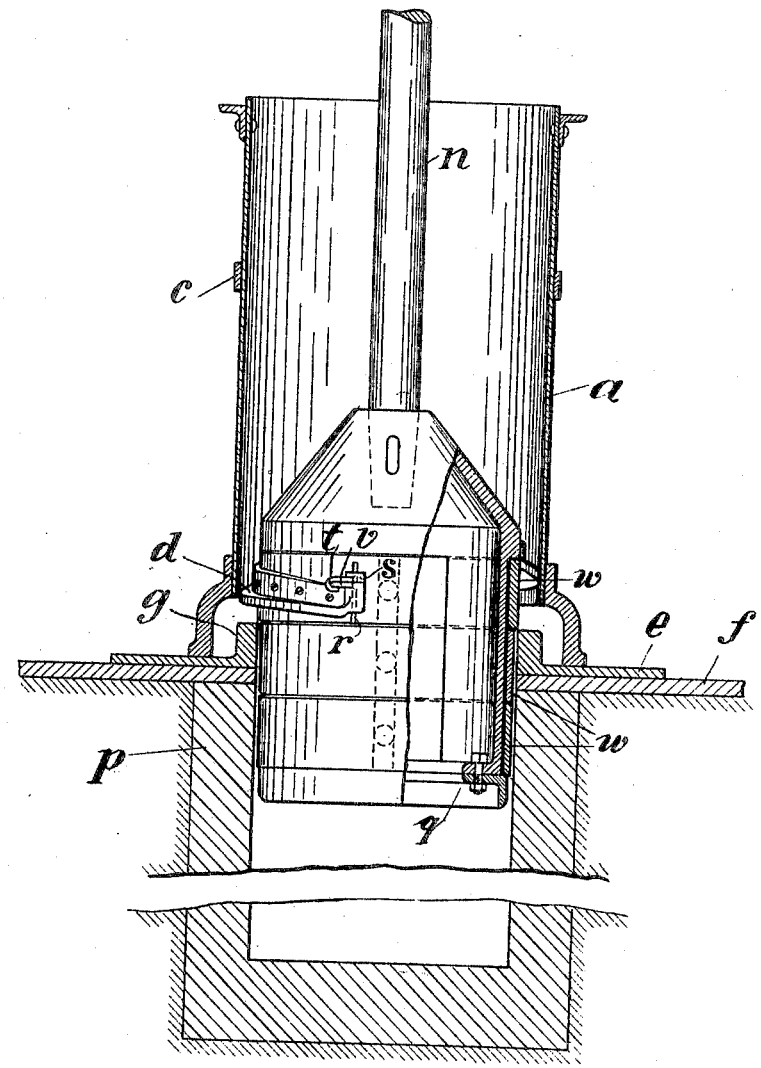

UNITED STATES PATENT OFFICE.

CARL J. KIELBERG, OF BORNHOLM, DENMARK.

MOLDING APPARATUS.

No. 811,297. Specification of Letters Patent. Patented Jan. 30, 1906.

Application filed June 21, 1905. Serial No. 266,217.

*To all whom it may concern:*

Be it known that I, CARL JOHAN KIELBERG, engineer, residing at Rönne, Bornholm, Denmark, have invented certain new and useful Improvements in Molding Apparatus, of which the following is a specification, reference being had to the accompanying drawings, forming a part hereof.

This invention relates to molding apparatuses, and more particularly to such apparatuses as are employed in the manufacture of cement pipes and the like; and its object is to improve such apparatuses with a view to turning out stronger and more durable pipe or other molded articles.

It is well known that cement pipes, being manufactured as they are by the compressing of cement in a properly-formed mold, exhibit lines of weakness where one mass or layer of cement joins another mass or layer, the mere compression of one mass or layer upon another being insufficient to produce the same degree of cohesion at such points as exists in other parts of the pipe. Particularly is this so in pipes where in their manufacture cement is added to and compressed upon a smooth surface, such as is formed in some apparatuses by the compressing-tool.

One object of the present invention is to provide means to prevent the formation of such smooth surfaces whereby the same cohesion shall exist between different masses or layers in the molded article as in other portions of the article, with the result that there will be no lines of weakness in the molded article at which it will be liable to crack or break.

Furthermore, where it is customary to employ a mold with a rotating core experience has shown that if the core be made in one piece it will in a very short time become worn by the continued rubbing action thereon of the cement, sand, gravel, crushed stone, and other similar material being molded to which the core is exposed. Accordingly where these cores have been made in one piece and, as was generally the case, of ordinary cast-iron they soon became deformed and were not able to impart the necessary pressure to make the pipe or other molded article in the proper dimensions. It was therefore necessary to remove the entire core and substitute a new core, thus involving frequent stoppages and increasing to a considerable degree the manufacturing expenses.

Another object of this invention, therefore, is to provide suitable means upon that portion of the core which experience has demonstrated to be subjected to the greatest wear, and which has therefore become quickly deformed, to resist such wear, which means are so secured to the core that they are capable of being easily and quickly reversed or removed, whereby when said means become worn their position upon the core may be changed or new means substituted. In this way stoppages incident to the replacing of an entire new core are obviated and considerable expense is avoided.

Moreover, in such apparatuses it has required a considerable degree of power to effect the rotation of the core owing to the friction between the core and the substance being molded. In the manufacture of cement pipe, for instance, where the core consists, as is generally the case, of a long cylindrically-shaped piece, the forward end of the core effects the shaping or forming of the pipe, while the rest of the core serves as a support for the molded portion and is drawn through the pipe, rotating against the inner surface thereof, which is in close contact with the surface of the core. In this way, as is obvious, a great deal of friction is produced which a corresponding amount of power in the driving mechanism for the core is required to overcome.

Another object of the present invention, therefore, is to provide means whereby a greater part of this friction may be obviated, and in accordance with the invention the forming portion of the core is made slightly largely in diameter or cross-section than the supporting portion thereof and exerts considerable pressure upon the wet cement or other molded substance between it and the mold, while the supporting portion, being slightly reduced in diameter, is relieved of the pressure of the molded substance which existed under the old conditions when a core with a uniform diameter was employed. In this way the pressure between the molded substance and the core is greatly reduced and much less power is required to drive the core, while the forming and supporting functions of the core are undisturbed.

For purposes of illustration and explanation the invention is shown in the drawings as embodied in an apparatus for making cement pipes.

In said drawings, Figure 1 is a view of the apparatus in side elevation, several of the parts for effecting the rotation of the core being omitted; and Fig. 2 is a view of the apparatus slightly modified in vertical central section through the mold with the rotating core in elevation.

The apparatus shown in the drawings has a bottom plate f, to which the upright members m of a frame are secured, said frame being provided for carrying a rotating core b, which molds the interior of the pipes, and the mechanism for rotating said core, which mechanism need not be illustrated or described herein. Upon the bottom plate f rests the base e of the mold, said base having a circular flange g, which, with the lower portion of an upright sectional mold a, forms the collar or flaring end the pipe. The mold a is preferably made in two parts, which are secured together by a band c, whereby the molded pipe may be easily removed therefrom. The core b is carried upon the lower end of a shaft n, journaled in suitable bearings in the frame m and provided with suitable means for rotating and elevating it, (partly shown,) whereby the rotation of said core may be effected and the position of said core determined. Upon the periphery of said core, preferably near its upper end, is a spirally-arranged rib or flange d, extending, preferably, once around the core. This rib or flange d may be formed from angle-iron, as shown in the drawings, or in any other suitable way.

When the apparatus is in operation, the sectional mold a, the sections of which are secured together by the band c, is placed upon the mold-base e, to which it is fastened by suitable clamps o, and the core b is brought to its lowermost position, Fig. 2, with its lower end projecting through openings in the base e and the bottom plate f. The apparatus when in use preferably rests upon a suitable foundation, (indicated at p,) which foundation may be adapted to receive the lower end of the core b when the core is in its lowermost position, as in Fig. 2. The cement or mortar of which a pipe is to be made is now placed in the mold from above and surrounds the top of the core, dropping down between the core and the walls of the mold. The shaft n is then caused to rotate, and the rib d travels around through the cement or other substance being molded. It will be obvious that the weight of the core acting upon the substance being molded through the rib d will force such substance strongly downward, first forming the collar and then as the core is forced upward by the traveling of the spiral rib through the mortar the rest of the pipe gradually from the bottom. Thus it will be seen the pipe is built up by adding and compressing the cement layer upon layer and, as is obvious, forming a continuous spiral strip.

If the forming-surface of the rib d were perfectly smooth, the cohesion between the layers—that is, at the spiral line which the rib d follows as the pipe is formed—would be less than any other part of the pipe, inasmuch as the compression is insufficient to unite the cement layers together and form a union therebetween which is firm enough to prevent a comparative weakness in the finished pipe along said line. In order to prevent the formation of such a line of weakness in the molded pipe, means are provided to roughen the surface left by the spiral rib as it rotates and gradually forms the pipe. The roughening of the surface in this manner not only secures a firmer cohesion of the cement as the next layer is pressed down upon it, but effects more or less interlocking of the surfaces and through both causes the line of weakness which would exist between two smooth surfaces is made to disappear. It is obvious that various provisions may be made for this purpose; but, as in the drawings, it is preferably constituted by a pin or plow r, extending through the lower end of the spiral rib, whereby a roughened or uneven surface is left in the cement after the rib has passed over it instead of a smooth surface, as would be the case if the under side of the rib were perfectly even. In order, however, that the top end of the pipe may be finished with a smooth surface, it is desirable that the pin r be capable of ready removal, and said pin is therefore preferably provided with a head s, to which it is rigidly secured, and extending from its head portion s is a bent arm or projection t. When the pin is in position, the head s rests down upon the flange d and the pin is turned so that the arm t engages a projection v upon the upper side of the rib d, whereby the pin r is securely held in position and may readily be disengaged and removed from the rib when desired.

In the molding process as above described that part of the core which suffers the greatest amount of wear is a zone immediately below the spiral rib, as experience has shown, and in accordance with the present invention means are provided whereby this part of the drum may be changed or renewed in order to make up for the wear at this point. Such means may comprise one or more rings w, preferably of hard metal, such as chilled iron or similar material. The rings may be made in one or more parts and are arranged upon the drum so that they may be readily removed and new ones substituted. When any ring or portion thereof becomes worn, so that the core does not effect the molding properly on that account, that ring may be removed and a new one substituted, or it is possible when one side has been worn more than the other side that simply reversing the position of the ring upon the core will be satisfactory.

In constructing the core to embody the improvements it may be formed in three parts w, x, and y, as shown in Fig. 1, the ring w constituting one of the parts. When this is the case, in assembling the parts of the core the ring is first fitted upon the lower part $y$, and the upper part $x$ is then inserted into the lower part and secured thereto by screws, one of which is indicated at $z$, or in any other suitable manner. The spiral rib is afterward placed upon the core near the ring, and one or more of the screws for fastening together the parts of the core may be employed, as shown, to secure the rib in place. Where several rings are employed, in order to protect a greater portion of the core the core may be constructed, as shown in Fig. 2, so that the rings may be slipped onto the core from the bottom, where they may be held by means of a flange $q$, bolted to the lower end of the core. The rings may be secured from turning upon the core by means of screws, as shown in Fig. 1, or keys or any other suitable means may be provided.

It will be clear that with a core having its periphery of the same dimensions throughout the friction between said periphery and the inner surface of the molded article, and consequently the degree of power required to rotate the core, will be substantially proportional to the superficial area of the core. In the manufacture of cement pipes this friction has been found to be very great, the rotation of the core requiring as much as twenty-horse power. In accordance with the present invention a portion of the core, preferably near the forward or upper end thereof, is made slightly greater in diameter than the rest of the core, so that a cross-section taken through this portion of the core is broader by about one or two millimeters (although these precise dimensions are not identical) than a section taken through any other part of the core. This portion, as will be obvious, constitutes the forming part of the core, and the wet cement or other substance being molded is subjected to sufficient pressure between this portion of the core and the mold to form the pipe or other article, while the supporting portion of the core retains in its molded form the substance already compressed into proper shape by the forming portion, and on account of the reduced diameter of the supporting portion there is a minimum of friction.

The invention is not limited to apparatuses for the manufacture of pipes, as it is obvious that it is applicable to the molding of various articles; nor is the invention limited to the precise embodiment herein shown and described, nor to any dimensions referred to.

I claim as my invention—

1. In a molding apparatus, the combination of a mold, a rotating core, a spiral rib upon the core, and means to roughen the surface formed by the rib, substantially as and for the purpose set forth.

2. In a molding apparatus, the combination of a mold, a rotating core, a spiral rib upon the core, and means upon the lower end of the rib to roughen the surface of the molded substance formed by the rib, substantially as and for the purpose set forth.

3. In a molding apparatus, the combination of a mold, a rotating core, a spiral rib upon the core, and a plow in the rib to roughen the surface of the molded material placed by the rib, substantially as and for the purpose set forth.

4. In a molding apparatus, the combination of a mold, a rotating core, and means upon the core to resist wear.

5. In a molding apparatus, the combination of a mold, a rotating core, a spiral rib on the core, and means just below the rib upon the core to resist wear.

6. In a molding apparatus, the combination of a mold, a rotating core, and removable means upon the core to resist wear.

7. In a molding apparatus, the combination of a mold, a rotating core, and a removable ring in the surface of the core to resist wear.

8. In a molding apparatus, the combination of a mold and a rotating core, said core having a supporting portion and a forming portion slightly greater in diameter than the supporting portion, substantially as and for the purpose set forth.

9. In a molding apparatus, the combination of a mold, and a cylindrical rotating core, said core having a forming portion near its forward end and a slightly-reduced supporting portion, substantially as and for the purpose set forth.

10. In a molding apparatus, the combination of a mold, and a cylindrical rotating core, said core having a ring in its surface of slightly greater diameter than the diameter of the core, substantially as and for the purpose set forth.

11. In a molding apparatus, the combination of a mold, a cylindrical rotating core, and a spiral rib upon the core, said core having a ring in its surface near the rib which ring has a slightly larger diameter than the diameter of the core, substantially as and for the purpose set forth.

This specification signed and witnessed this 16th day of May, A. D. 1905.

C. J. KIELBERG.

In presence of—
 W. SLESSING,
 A. CHRISTENSEN.